US 10,106,296 B2

(12) United States Patent
LePinske et al.

(10) Patent No.: US 10,106,296 B2
(45) Date of Patent: Oct. 23, 2018

(54) NESTING COOKING VESSELS

(71) Applicant: WKI HOLDING COMPANY, INC., Rosemont, IL (US)

(72) Inventors: Jason LePinske, Carol Stream, IL (US); Kenneth C. Lundgreen, Spring Grove, IL (US); Hsuan-Tsun Wang, Oak Park, IL (US)

(73) Assignee: WKI Holding Company, Inc., Rosemont, IL (US)

( * ) Notice: Subject to any disclaimer, the term of this patent is extended or adjusted under 35 U.S.C. 154(b) by 138 days.

(21) Appl. No.: 14/991,470

(22) Filed: Jan. 8, 2016

(65) Prior Publication Data

US 2017/0197755 A1    Jul. 13, 2017

(51) Int. Cl.
| B65D 21/032 | (2006.01) |
| B65D 21/02 | (2006.01) |
| B65D 25/28 | (2006.01) |
| A47J 27/00 | (2006.01) |
| A47J 45/06 | (2006.01) |

(52) U.S. Cl.
CPC ........ B65D 21/0233 (2013.01); A47J 27/002 (2013.01); A47J 45/06 (2013.01); A47J 45/065 (2013.01); B65D 21/0212 (2013.01); B65D 25/28 (2013.01)

(58) Field of Classification Search
CPC ............ B65D 21/0233; B65D 21/0228; B65D 21/0209; B65D 21/0212; B65D 25/28; A47J 45/065; A47J 45/06
USPC ........................ 220/756, 759, 573.1; 206/514
See application file for complete search history.

(56) References Cited

U.S. PATENT DOCUMENTS

| 1,095,038 A | * | 4/1914 | Sowden | ................ A47J 45/071 |
| | | | | 220/573.1 |
| 2,442,454 A | * | 6/1948 | Bodell | .................. A47J 45/071 |
| | | | | 16/335 |

(Continued)

FOREIGN PATENT DOCUMENTS

| CN | 101478899 A | 7/2009 |
| CN | 101478899 B | 2/2011 |

(Continued)

OTHER PUBLICATIONS

International Search Report and Written Opinion from International Application No. PCT/US2017/012390 dated Apr. 11, 2017, application now published as International Publication No. WO2017/120377 dated Jul. 13, 2017.

*Primary Examiner* — Stephen Castellano
(74) *Attorney, Agent, or Firm* — Morgan, Lewis & Bockius LLP (57) ABSTRACT

A cooking vessel is provided. The cooking vessel includes a vessel body, a handle, a locking portion and a bail. The vessel body has an inner surface and an outer surface. The handle has an upper surface, a lower surface, a proximal end and a distal end. The proximal end of the handle is coupled to the vessel body. The locking portion is disposed in one of either the lower surface and the distal end of the handle. The bail is coupled to the handle proximate the distal end of the handle. The bail is movable between an unlocked position and a locked position, and the bail is configured to cooperatively and lockingly engage a locking portion of a second cooking vessel when the bail is in the locked position.

8 Claims, 8 Drawing Sheets

(56) References Cited

U.S. PATENT DOCUMENTS

| | | | |
|---|---|---|---|
| 3,059,809 A | * | 10/1962 | Thompson, III ...... A47J 45/071 |
| | | | 220/759 |
| 3,641,920 A | | 2/1972 | Kraft |
| 4,206,853 A | * | 6/1980 | Iten ...................... A47J 45/072 |
| | | | 220/759 |
| 4,478,349 A | | 10/1984 | Haverland et al. |
| 5,131,708 A | | 7/1992 | Denzin |
| 5,184,836 A | | 2/1993 | Andrews, Jr. |
| 5,337,910 A | * | 8/1994 | Picozza ................... A23B 7/10 |
| | | | 220/322 |
| 6,796,221 B1 | | 9/2004 | Cangioli |
| 7,753,206 B2 | | 7/2010 | Sawhney |
| 8,123,067 B2 | | 2/2012 | Thomson |
| 8,272,531 B2 | | 9/2012 | Cuillery |
| 8,413,840 B2 | | 4/2013 | Metaxatos |
| 8,714,011 B2 | | 5/2014 | Hood |
| 8,806,935 B2 | | 8/2014 | Hood |
| 8,978,547 B2 | | 3/2015 | Salvino |
| 2007/0119744 A1 | | 5/2007 | Metaxatos et al. |
| 2009/0266738 A1 | | 10/2009 | Dunford |
| 2010/0230319 A1 | | 9/2010 | Thomson |
| 2012/0198930 A1 | | 8/2012 | Hood |
| 2012/0258224 A1 | | 10/2012 | Salvino |
| 2013/0098920 A1 | | 4/2013 | Lee |

FOREIGN PATENT DOCUMENTS

| | | |
|---|---|---|
| EP | 1876935 A1 | 1/2008 |
| EP | 2037780 B1 | 7/2014 |
| GB | 2439271 A | 12/2007 |
| WO | WO 1994010054 A1 | 5/1994 |
| WO | WO 1994024914 A1 | 11/1994 |
| WO | WO 2007148123 A2 | 12/2001 |
| WO | WO 2007148123 A3 | 12/2007 |
| WO | WO 2017/120377 A1 | 7/2017 |

* cited by examiner

NESTING COOKING VESSELS

TECHNICAL FIELD

The present disclosure relates to cooking vessels, and more particularly to a cooking vessel system where cooking vessels nest cooperatively.

BACKGROUND

Nesting cooking vessels are generally known in the relevant art. However, such cooking vessels may not securely nest in a releasably locked fashion. Further, known nesting cooking vessels may allow contact between various surfaces of the cooking vessels in a nested state. Such contact may damage various features of the cooking vessels, such as vessel bodies or vessel body coatings. The accessories or integrated features available on these known nesting cooking vessels do not adequately address these issues.

The present disclosure is provided to address the problems discussed above and other problems, and to provide advantages and aspects not presently provided by known cooking vessels. A full discussion of the features and advantages of certain preferred embodiments of the present disclosure is deferred to the following detailed description, which proceeds with reference to the accompanying drawings.

SUMMARY

According to one embodiment of the present disclosure, a cooking vessel is provided. The cooking vessel can include a vessel body, a handle, a locking portion and a bail. The vessel body has an inner surface and an outer surface. The handle has an upper surface, a lower surface, a proximal end coupled to the vessel body, and a distal end. The locking portion is disposed in one of either the lower surface and the distal end of the handle. The bail is coupled to the handle proximate the distal end. The bail is movable between an unlocked position and a locked position, and the bail is configured to cooperatively and lockingly engage a locking portion of a second cooking vessel when the bail is in the locked position.

According to another embodiment of the present disclosure, a cooking vessel set is provided. The cooking vessel set can include a first cooking vessel and a second cooking vessel in which the first cooking vessel is sized to nest within the second cooking vessel. The first and second cooking vessel each can comprise a vessel body, a handle, a locking portion and a bail. Each vessel body has an inner surface and an outer surface. The vessel body of the first cooking vessel has a first diameter and a first depth, and the vessel body of the second cooking vessel has a second diameter and a second depth. The first diameter can be smaller than the second diameter and the first depth can be smaller than the second depth.

The handle has a proximal end coupled to the vessel body, and a distal end. The locking portion is disposed in one of either the lower surface and the distal end of the handle. The bail is coupled to the handle proximate the distal end. The bail is movable between an unlocked position and a locked position. Further, when the first cooking vessel is nested within the second cooking vessel and the bail of the first cooking vessel is in the locked position, the bail of the first cooking vessel lockingly engages the locking portion of the second cooking vessel and the first cooking vessel is substantially suspended within the second cooking vessel in a cantilevered manner.

According to an additional embodiment of the current disclosure, a method for lockingly securing cooking vessels is provided. According to the method, a first cooking vessel and a second cooking vessel are provided, and each cooking vessel can include a vessel body, a handle, a locking portion and a bail.

The vessel body has an inner surface and an outer surface. The vessel body of the first cooking vessel has a first diameter and a first depth, and the vessel body of the second cooking vessel has a second diameter and a second depth. The first diameter is smaller than the second diameter and the first depth is smaller than the second depth.

The handle has a proximal end and a distal end, and the proximal end of the handle is coupled to the vessel body. The locking portion is disposed on one of either the lower surface and the distal end of the handle. The bail is coupled to the handle proximate the distal end of the handle, and the bail is movable between an unlocked position and a locked position.

The method can further comprise nesting the first cooking vessel within the second cooking vessel. In an embodiment, the method can also comprise actuating the bail of the first cooking vessel to the locked position, wherein the bail of the first cooking vessel lockingly engages the locking portion of the second cooking vessel and substantially suspends the first cooking vessel within the second cooking vessel in a cantilevered manner. In an embodiment, an outer surface of the first cooking vessel does not contact an inner surface of the second cooking vessel when the first coking vessel is substantially suspended in the second cooking vessel in a cantilevered manner.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

While this disclosure is susceptible of embodiments in many different forms, there is shown in the drawings and will herein be described in detail preferred embodiments of the disclosure with the understanding that the present disclosure is to be considered as an exemplification of the principles of the disclosure and is not intended to limit the broad aspect of the disclosure to the embodiments illustrated.

Disclosed herein are various embodiments of a first cooking vessel 10 and a cooking vessel system 12. In one embodiment, as shown in FIGS. 1-9, the first cooking vessel 10 is comprised of a vessel body 14 having an inner surface 18 and an outer surface 22. The first cooking vessel 10 also includes a handle 26 having an upper surface 30, a lower surface 34, a proximal end 38 and a distal end 42. The proximal end 38 of the handle is coupled to the vessel body 14, and the proximal end 38 of the handle is disposed closer to the vessel body 14 than is the distal end 42 of the handle.

The vessel body 14 and/or the handle 26 can be made from various materials, including, but not limited to, metals, stainless steel or other metal alloys, polymers, plastics, ceramics, stone, glass or wood. Further, the vessel body 14 and/or the handle 26 can include various coatings, including, but not limited to, anti-corrosive, non-stick, reflectivity-enhancing or colored coatings. The vessel body 14 can comprise a substantially cylindrical shape, but it is to be understood that the vessel body 14 can comprise any shape, including, but not limited to, ovular, elliptical, stadium, polygonal or hemispherical shapes.

The handle 26 can connect to the vessel body 14 through bonding, joining, welding, rivets, screws, adhesives or other conventional attachment techniques. Additionally, the handle 26 can comprise a thermally-insulating material, or such a material can be disposed between the handle 26 and the vessel body 14.

Figure 2:
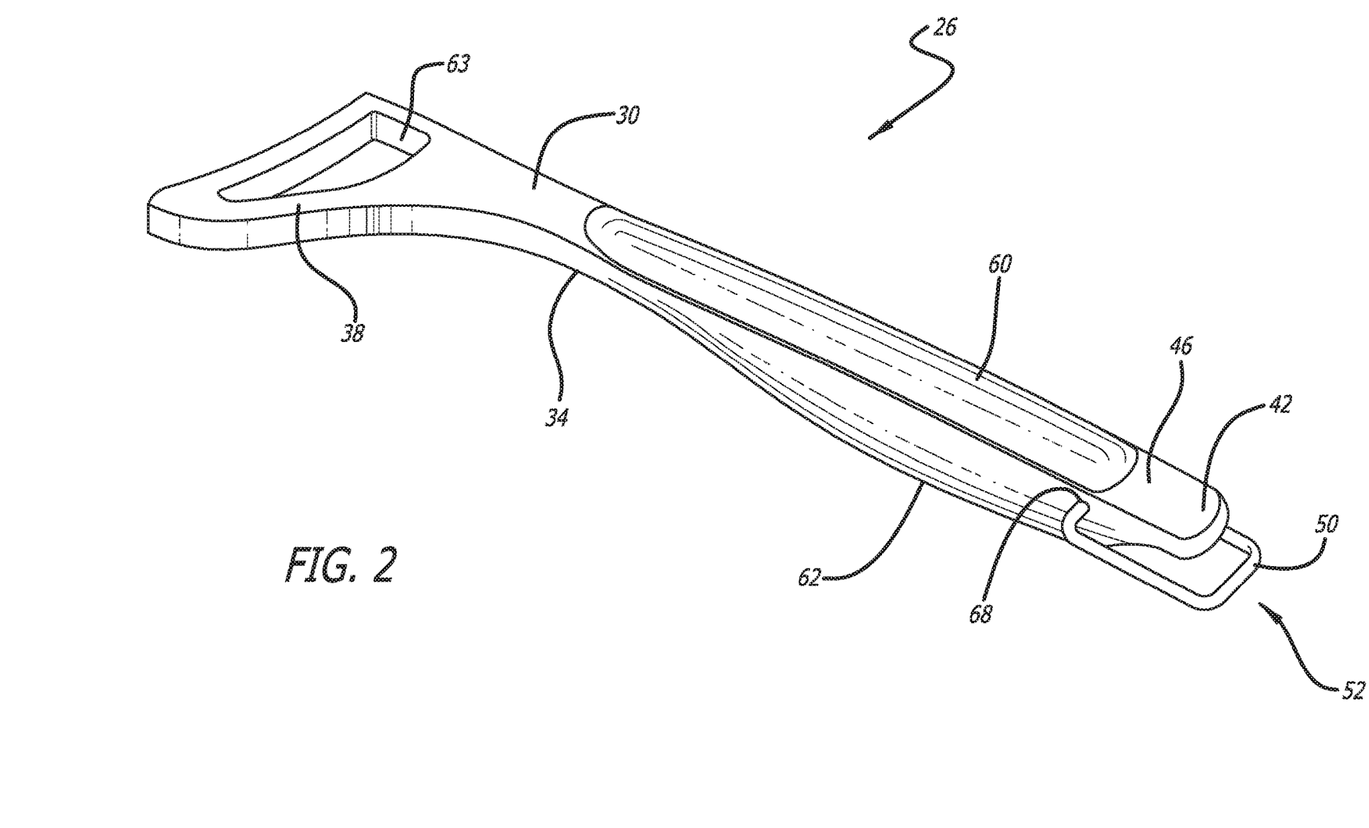
FIG. 2 is a top perspective view of a handle of the cooking vessel of FIG. 1 according to an embodiment of the present disclosure.

In one embodiment, the first cooking vessel 10 includes a locking portion 46 disposed in the lower surface 34 and/or the distal end 42 of the handle 26 proximate the distal end 42, as shown in FIG. 2. A bail 50 is coupled proximate the distal end 42 of the handle, and the bail 50 is movable between an unlocked position 52 and a locked position 54. Further, the bail 50 is configured to cooperatively and lockingly engage a second locking portion 47 disposed on a second cooking vessel 58 when the bail 50 is in the locked position 54.

Figure 3:
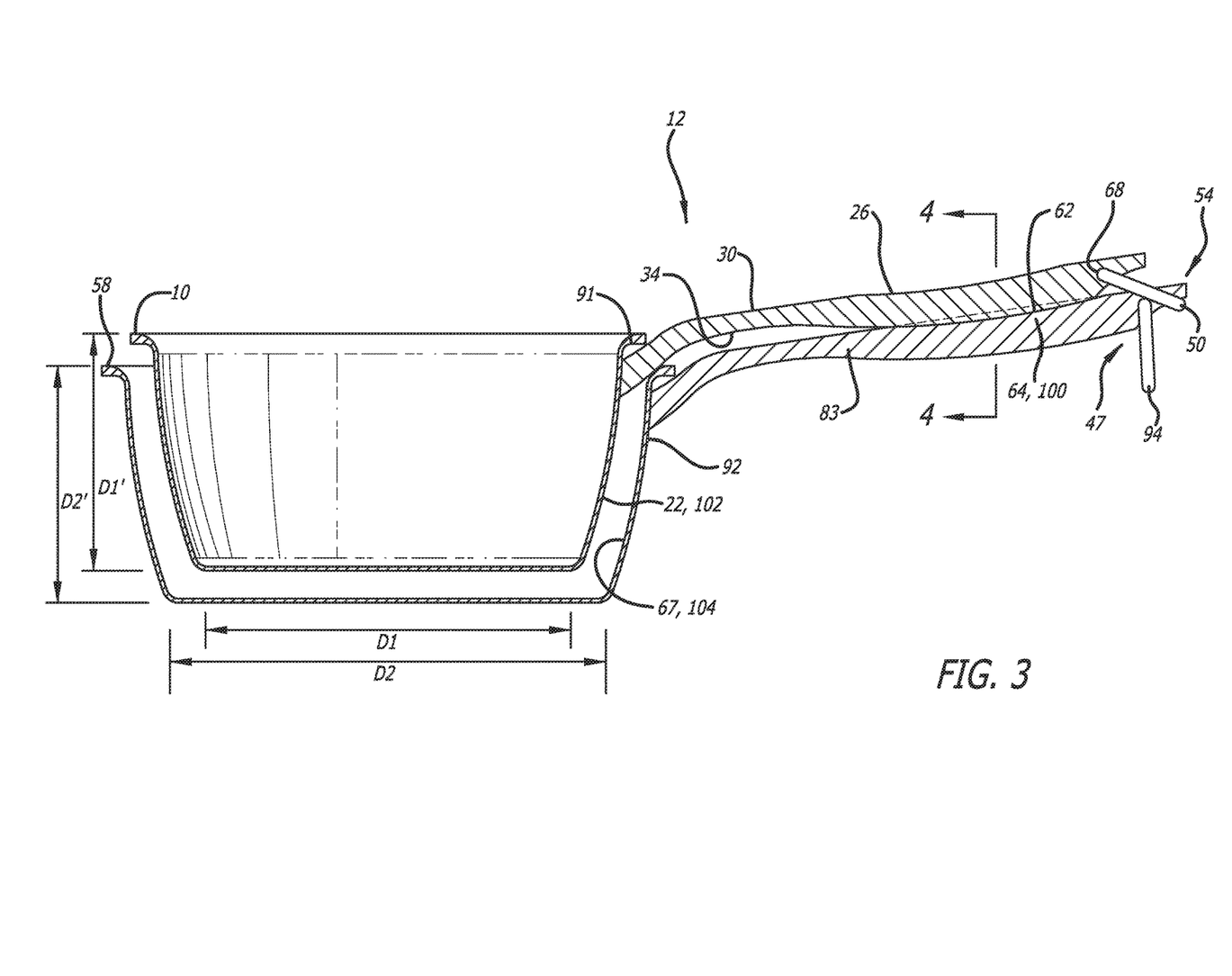
FIG. 3 is a cross-sectional view of nested cooking vessels according to an embodiment of the present disclosure.
Figure 4:
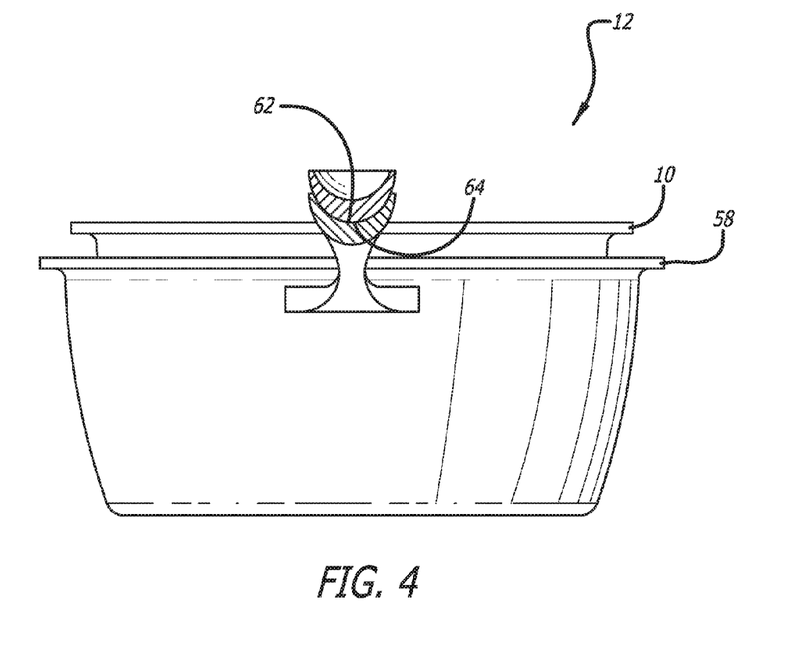
FIG. 4 is a cross-sectional view of nested cooking vessels according to an embodiment of the present disclosure taken across the line 4-4.

According to another embodiment shown in FIGS. 2 and 3, the upper surface 30 includes a concave trough 60 and at least a portion of the lower surface 34 defines a convex surface 62. The first cooking vessel 10 can be sized to nest within the second cooking vessel 58. Further, when the first cooking vessel 10 is nested within the second cooking vessel 58 and the bail 50 is in the locked position 54, the convex surface 62 of the first cooking vessel 10 can be at least partially disposed within a concave trough 64 of the second cooking vessel 58, as best shown in FIG. 4.

Figure 1:
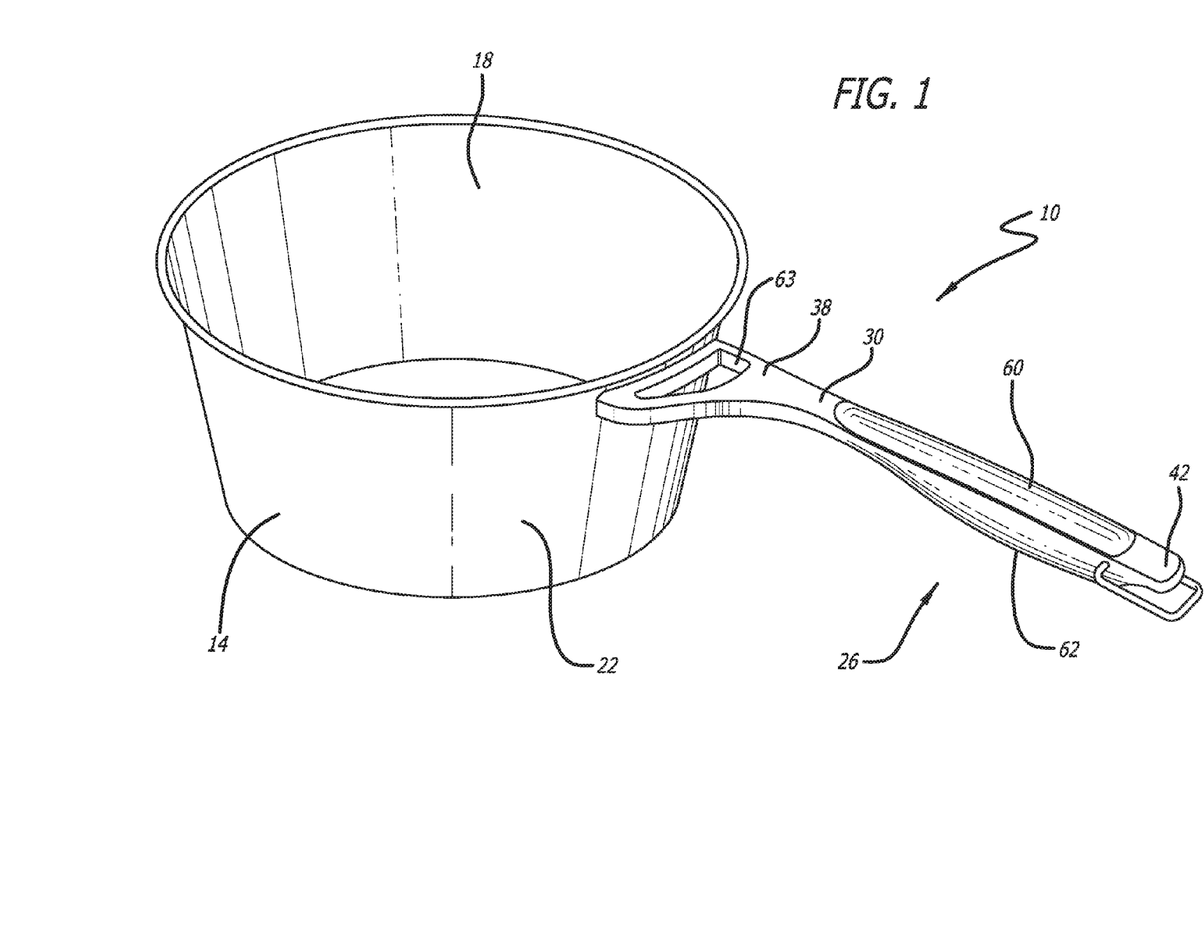
FIG. 1 is a top perspective view of a cooking vessel according to an embodiment of the present disclosure.

In one embodiment, as shown in FIGS. 1 and 2, the handle 26 includes one or more apertures 63. The concave trough 60 can be disposed along all of, or a portion of, the upper surface 30. Similarly, the convex surface 62 can be disposed along all of, or a portion of, the lower surface 34.

In another embodiment, the first cooking vessel 10 is sized to nest within the second cooking vessel 58, and when the first cooking vessel 10 is nested within the second cooking vessel 58 and the bail 50 is in the locked position 54, the outer surface 22 of the first cooking vessel does not contact an inner surface 67 of the second cooking vessel, as shown in FIG. 3.

Figure 6:
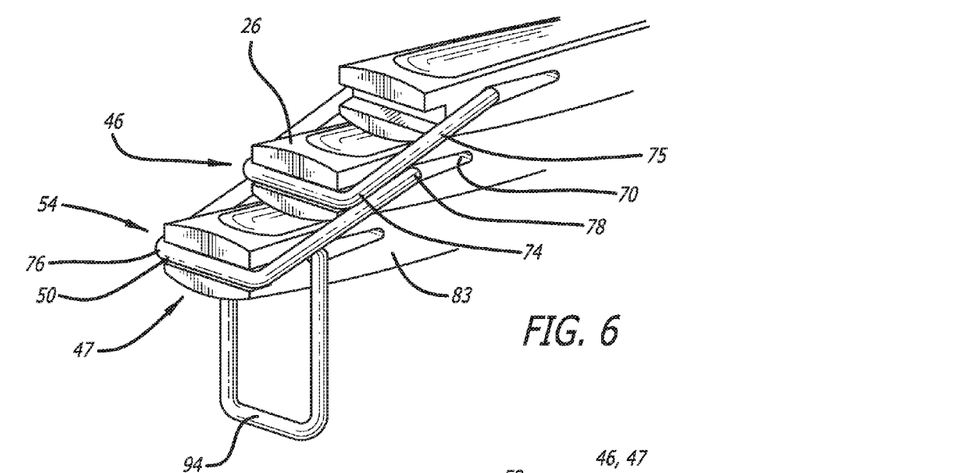
FIG. 6 is a perspective view of a plurality of locking sections shown in locked positions according to an embodiment of the present disclosure.
Figure 7:
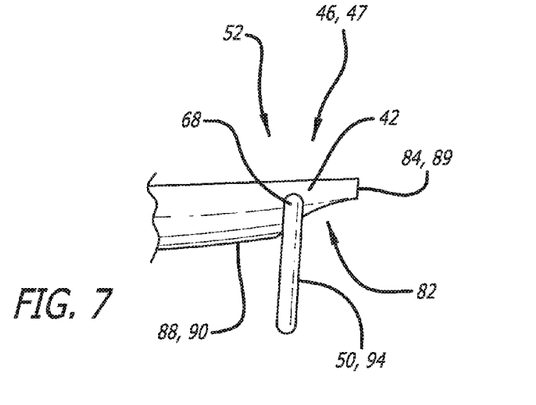
FIG. 7 is a side view of a locking section, showing an alternate embodiment of the locking section from that shown in FIG. 5, according to an embodiment of the present disclosure.
Figure 8:
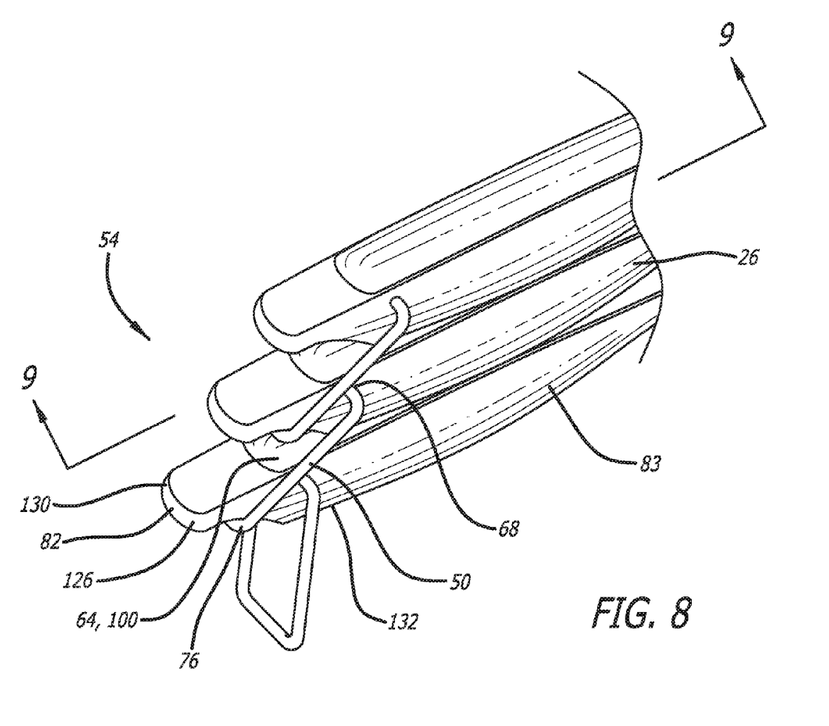
FIG. 8 is a perspective view of a plurality of locking sections shown in locked positions, showing an alternate embodiment of the locking section from that shown in FIG. 6, according to an embodiment of the present disclosure.

The bail 50 can be rotatably connected to the handle 26 at a pivot point 68 on the handle 26, as shown in FIGS. 7 and 8. The pivot point 68 can be located proximate the distal end 42 of the handle. In another embodiment shown in FIGS. 5 and 6, a portion of the bail 50 can be rotatably and slidably connected to the handle 26 at a slot 70, and the slot 70 can be disposed proximate the distal end of the handle 26.

Figure 5:
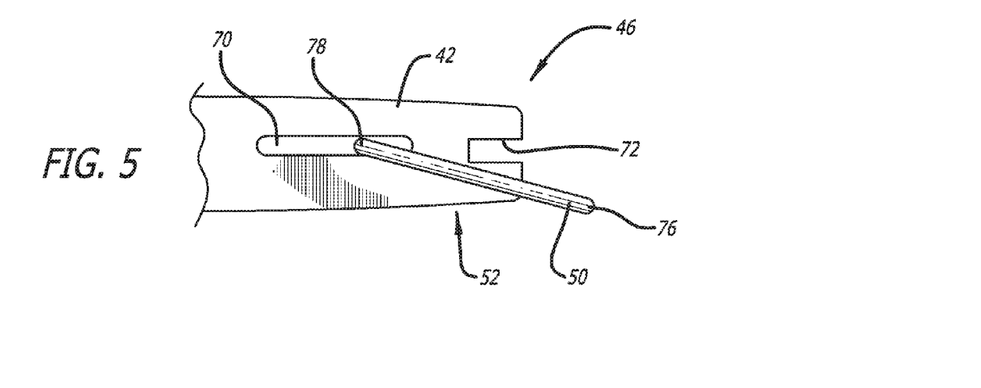
FIG. 5 is a side view of a locking section according to an embodiment of the present disclosure.

The locking portion 46 can comprise a notch 72 configured to cooperatively receive a free end 74 of a third bail 75, as shown in FIGS. 5 and 6. When the notch 72 cooperatively receives the free end 74 of the third bail 75, such an arrangement can describe the third bail 75 as being in the locked position 54. The third bail 75 can be rotatably and/or slidably connected to one or more additional, cooking vessels, other than the first cooking vessel 10 or the second cooking vessel 58.

The locked position 54 can also comprise a state of, or be associated with, a cooking vessel rotatably and/or slidably connected to the bail 50, being releasably attached to a cooking vessel that includes the second locking portion 47 into which the bail 50 is lockingly and/or releasably received.

In another embodiment shown in FIGS. 7 and 8, a first end 78 of the bail is connected to the handle 26 of the cooking vessel and a free end 76 of the bail 50 releasably couples with the second locking portion 47 comprising a lip 82 on a second handle 83 located on the second cooking vessel 58. The locking portion 46, 47 can comprise a notch 72 and/or a lip 82. When the first end 78 of the bail is connected to the handle 26 of the cooking vessel and a free end 76 of the bail 50 is releasably coupled with a lip 82 on the second handle 83 of the second cooking vessel 58, such an arrangement can be described as the locked position 54. The locked position 54 can comprise a state of, or be associated with, the first cooking vessel 10 being attached, releasably or otherwise, to the second cooking vessel 58.

The lip 82 can be formed by an upper portion 84 of the second handle 83 of the second cooking vessel extending farther from a second vessel body 92 of the second cooking vessel than does a bottom portion 88 of the second handle 83 of the second cooking vessel. Such a lip 82 or a notch 72, as described above, can also exist on the handle 26 of the first cooking vessel, or on other cooking vessels, and a corresponding upper portion 89 and lower portion 90 of the handle 26 are shown in FIG. 7.

According to one embodiment of the present disclosure, shown in FIGS. 1-10, the cooking vessel system 12 includes the first cooking vessel 10 and the second cooking vessel 58. The first cooking vessel 10 is sized to nest within the second cooking vessel 58. The first cooking vessel 10 and second cooking vessel 58 can each include a vessel body 14 having an inner surface 18 and an outer surface 22. A vessel body 91 of the first cooking vessel has a first diameter D1 and a first depth D1', and a vessel body 92 of the second cooking vessel has a second diameter D2 and a second depth D2', as best shown in FIG. 3. The first diameter D1 can be smaller than the second diameter D2 and the first depth D1' can be smaller than the second depth D2'.

The first cooking vessel 10 and the second cooking vessel 58 can include a handle 26 and a second handle 83, respectively, each having a proximal end 38 and a distal end 42. The proximal end 38 of each handle 26, 83 is coupled to the respective vessel body 91, 92. The first cooking vessel 10 can include a locking portion 46 and the second cooking vessel 58 can include a second locking portion 47, and each can be disposed on a lower surface 34 or lower portion 90 or the bottom portion 88 and/or a distal end 42 of each respective handle 26, 83.

The first cooking vessel 10 can include a bail 50 coupled proximate the distal end 42 of the handle 26 and the second cooking vessel 58 can include a second bail 94 coupled proximate the distal end 42 of the second handle 83. In one embodiment, each bail 50, 94 is movable between the unlocked position 52 and the locked position 54. The locked position 54 can be defined as when a bail 50, 94, or a portion of the bail, of one cooking vessel is releasably attached to a locking portion 46, 47 of another cooking vessel. In another embodiment, when the first cooking vessel 10 is nested within the second cooking vessel 58 and a bail 50 of the first cooking vessel is in the locked position 54, a portion of the bail 50 of the first cooking vessel lockingly engages the second locking portion 47 of the second cooking vessel 58. When the bail 50 of the first cooking vessel is in the locked position 54, the first cooking vessel 10 is substantially suspended within the second cooking vessel 58 in a cantilevered manner. In another embodiment, when the bail 50 of the first cooking vessel is in the locked position 54, the first vessel body 91 is substantially suspended within the second vessel body 92 in a cantilevered manner.

In one embodiment of the present disclosure, the handle 26 comprises an upper surface 30 and a lower surface 34. The upper surface 30 includes a concave trough 60 and at least a portion of the lower surface 34 defines a convex surface 62, as best shown in FIGS. 2 and 3.

According to another embodiment shown in FIGS. 3, 4, 6 and 8-10, when the first cooking vessel 10 is nested within the second cooking vessel 58 and the bail 50 of the first cooking vessel is in the locked position 54 by nature of being releasably coupled with the second locking portion 47, the convex surface 62 of the first cooking vessel is at least partially disposed within a concave trough 100 of the second cooking vessel. In another embodiment, when the first cooking vessel 10 is nested within the second cooking vessel 58 and the bail 50 of the first cooking vessel is in the locked position 54 by nature of being releasably coupled with the second locking portion 47, an outer surface 102 of the first vessel body does not contact an inner surface 104 of the second vessel body, as shown in FIG. 3.

The bail 50 of the first cooking vessel can be rotatably connected to the handle 26 of the first cooking vessel at a pivot point 68 on the handle 26, or proximate the distal end 42 of the handle 26, of the first cooking vessel, as shown in FIGS. 7 and 8. The bail 50 can rotatably connect to the handle 26 at the first end 78 of the bail. In an alternate embodiment, the handle 26 of the first cooking vessel can include a slot 70 disposed proximate the distal end 42 of the handle 26 of the first cooking vessel, and a portion of the bail 50 of the first cooking vessel is rotatably and slidably disposed within the slot 70, as shown in FIGS. 5 and 6. In the manner described above, the slot 70 and pivot point 68 can also connect a second bail 94 to a second handle 83.

The locked position 54 can comprise a state of, or be associated with, a cooking vessel rotatably and/or slidably connected to the bail 50, as described, being attached to a cooking vessel having the locking portion 47 into which the bail 50 is lockingly and/or releasably received, when the bail 50 is received in the locking portion 47 of the latter cooking vessel. For example, the locked position 54 can comprise the bail 50 lockingly attached to the second locking portion 47.

In one embodiment of the present disclosure shown in FIGS. 5 and 6, the second locking portion 47 of the second cooking vessel is a notch 72 configured to cooperatively receive a free end 76 of the bail 50 of the first cooking vessel. When the second locking portion 47 of the second cooking vessel cooperatively and/or lockingly receives the free end 76 of the bail 50 of the first cooking vessel, such an arrangement can be described as the locked position 54. The locked position 54 can comprise a state of, or be associated with, the first cooking vessel 10 being releasably attached to the second cooking vessel 58.

In another embodiment shown in FIGS. 7 and 8, a first end 78 of the bail 50 of the first cooking vessel is connected to the handle 26 of the first cooking vessel and the free end 76 of the bail 50 of the first cooking vessel releasably couples with a lip 126 on the second handle 83 of the second cooking vessel. When the free end 76 of the bail of the first cooking vessel releasably couples with the lip 126, such an arrangement can be described as the locked position 54. The locked position 54 can comprise a state of, or be associated with, the first cooking vessel 10 being attached to the second cooking vessel 58. The lip 126 can be formed by an upper portion 84 of the second handle 83 extending farther from the vessel body 92 of the second cooking vessel than does a bottom portion 88 of the second handle 83.

Figure 9:
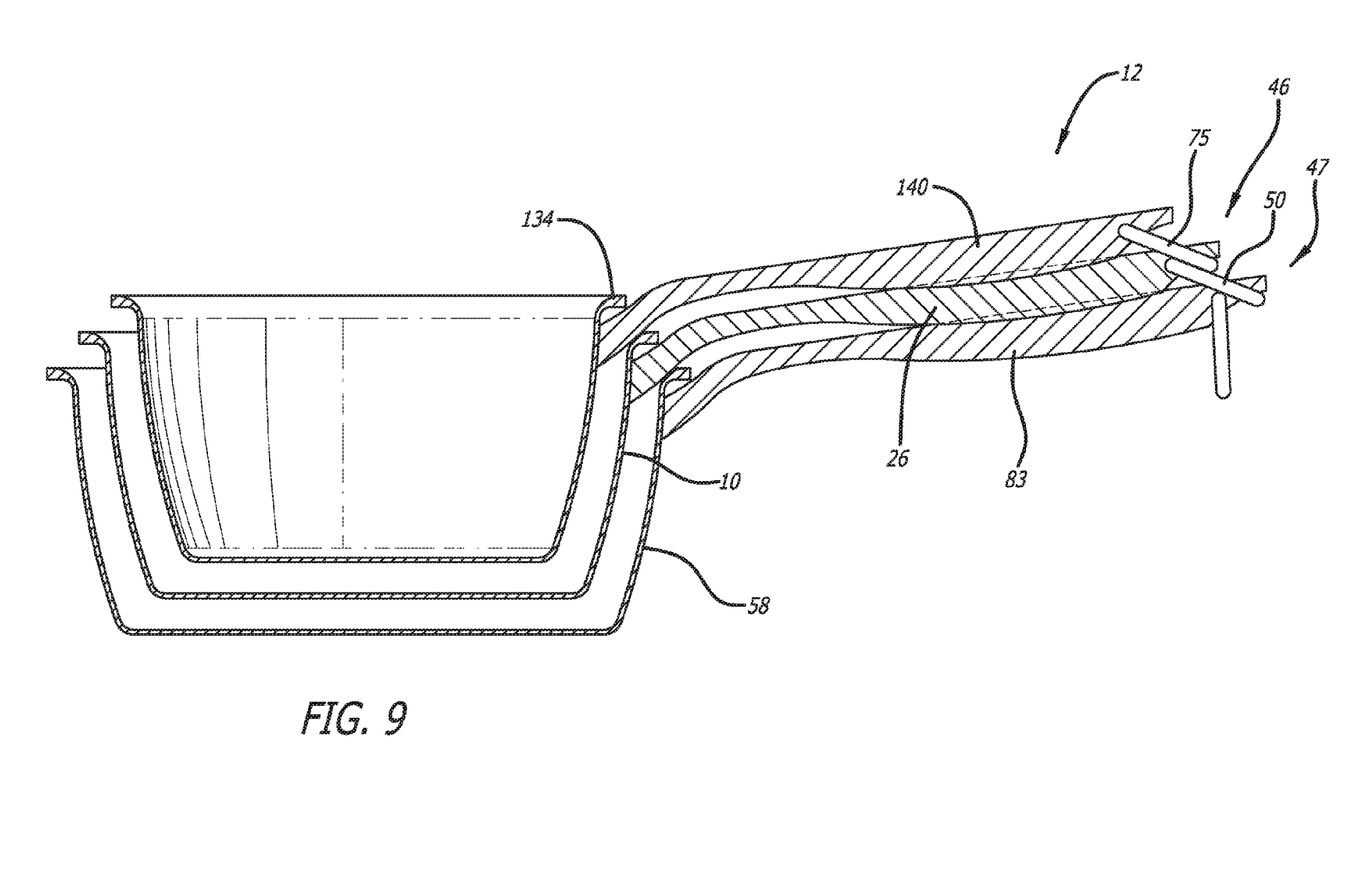
FIG. 9 is a cross-sectional view of a plurality of nested cooking vessels according to an embodiment of the present disclosure shown in FIG. 8.
Figure 10:
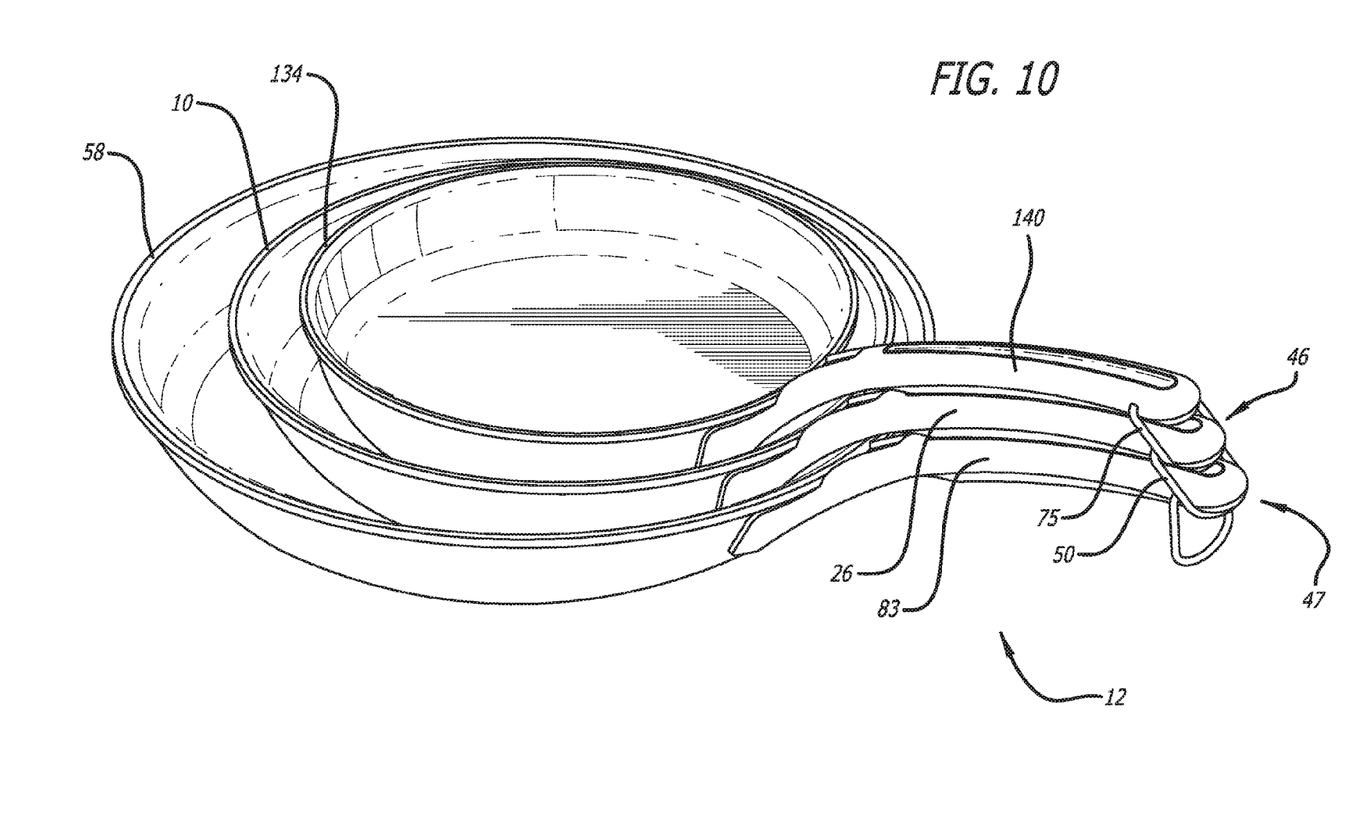
FIG. 10 is a perspective view of a plurality of nested cooking vessels according to an embodiment of the present disclosure shown in FIG. 8.

Additionally, as shown in FIGS. 9 and 10, the second cooking vessel 58 can also nest within a third cooking vessel 134. In an embodiment, the third cooking vessel 134 can nest within the first cooking vessel 10 in the same fashion that the first cooking vessel 10 nests within the second cooking vessel 58. Additionally, the third cooking vessel 134 can releasably attach to the locking portion 46 of the first cooking vessel 10 via the third bail 75, which can be slidably and/or rotatably connected to a third handle 140 of the third cooking vessel 134.

When the second cooking vessel 58 nests within the third cooking vessel 134, the first cooking vessel 10 can simultaneously nest within the second cooking vessel 58. It is to be understood that the cooking vessel system 12 can include more than three cooking vessels, and that the more than three cooking vessels can nest together as described above regarding the nesting of the first cooking vessel 10, the second cooking vessel 58 and the third cooking vessel 134.

In another embodiment, when the third cooking vessel 134 releasably attaches to the locking portion 46 of the first cooking vessel 10 via the third bail 75, the first cooking vessel 10 can simultaneously releasably attach to the second cooking vessel 58 through the bail 50 and second locking portion 47. It is to be understood that the cooking vessel system 12 can include more than three cooking vessels, and that the more than three cooking vessels can releasably attach together as described above regarding the attachment of the first cooking vessel 10, the second cooking vessel 58 and the third cooking vessel 134.

As shown in FIGS. 1-10, a method for lockingly securing cooking vessels as described herein is also disclosed. In one embodiment, the first cooking vessel 10, the second cooking vessel 58 and the third cooking vessel 134 as described above are provided. The method can also include nesting the first cooking vessel 10 within the second cooking vessel 58. In one embodiment, the method includes actuating the bail 50 of the first cooking vessel to the locked position 54 wherein a portion of the bail 50 of the first cooking vessel lockingly engages the second locking portion 47 of the second cooking vessel and substantially suspends the first cooking vessel 10 within the second cooking vessel 58 in a cantilevered manner. In another embodiment, the outer surface 102 of the first vessel body does not contact the inner surface 104 of the second vessel body when the first cooking vessel 10 is substantially suspended in the second cooking vessel 58 in a cantilevered manner.

The disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A cooking vessel set, comprising:
   a first cooking vessel and a second cooking vessel, the first cooking vessel being sized to nest within the second cooking vessel, the first and second cooking vessel each comprising:
   a vessel body having an inner surface and an outer surface, the vessel body of the first cooking vessel having a first diameter and a first depth, and the vessel body of the second cooking vessel having a second diameter and a second depth, wherein the first diameter is smaller than the second diameter and the first depth is smaller than the second depth;
   a handle having an upper surface, a lower surface, a proximal end and a distal end, the proximal end of the handle being coupled to the vessel body;
   a locking portion disposed in one of either the lower surface and the distal end of the handle; and
   a bail coupled to the handle proximate the distal end of the handle, the bail being movable between an unlocked position and a locked position;
   wherein, when the first cooking vessel is nested within the second cooking vessel and the bail of the first cooking vessel is in the locked position, the bail of the first cooking vessel lockingly engages the locking portion of the second cooking vessel and the first cooking vessel is substantially suspended within the second cooking vessel in a cantilevered manner; and
   wherein the locking portion of the second cooking vessel comprises at least one of a lip and a notch.

2. The cooking vessel set of claim 1, wherein the upper surface includes a concave trough and wherein at least a portion of the lower surface defines a convex surface.

3. The cooking vessel set of claim 2, wherein, when the first cooking vessel is nested within the second cooking vessel and the bail of the first cooking vessel is in the locked position, the convex surface of the first cooking vessel is at least partially disposed within the concave trough of the second cooking vessel.

4. The cooking vessel set of claim 1, wherein when the first cooking vessel is nested within the second cooking vessel and the bail of the first cooking vessel is in the locked position, the outer surface of the vessel body of the first cooking vessel does not contact the inner surface of the second cooking vessel.

5. The cooking vessel set of claim 1, wherein the bail is rotatably connected to the handle at a pivot point on the handle.

6. The cooking vessel set of claim 1, further comprising a slot disposed proximate the distal end of the handle, wherein a portion of the bail is rotatably and slidably disposed within the slot.

7. The cooking vessel set of claim 1, the notch is configured to cooperatively receive a free end of the bail of the first cooking vessel.

8. The cooking vessel set of claim 1, wherein a first end of the bail of the first cooking vessel is connected to the handle of the first cooking vessel and a free end of the bail of the first cooking vessel releasably couples with the lip on the handle of the second cooking vessel to attach the first cooking vessel to the second cooking vessel, wherein the lip is formed by an upper portion of the handle of the second cooking vessel extending farther from the vessel body of the second cooking vessel than does a bottom portion of the handle of the second cooking vessel.

\* \* \* \* \*